United States Patent [19]

Persyk et al.

[11] Patent Number: 4,605,856
[45] Date of Patent: Aug. 12, 1986

[54] METHOD AND DEVICE FOR STABILIZING PHOTOMULTIPLIER TUBES OF A RADIATION IMAGE DEVICE AGAINST DRIFT

[75] Inventors: Dennis E. Persyk, Barrington; Keith A. Ritter, Addison, both of Ill.

[73] Assignee: Siemens Gammasonics, Inc., Des Plaines, Ill.

[21] Appl. No.: 549,937

[22] Filed: Nov. 9, 1983

[51] Int. Cl.$^4$ .............................................. G01T 1/202
[52] U.S. Cl. ................... 250/363 S; 250/362; 250/369
[58] Field of Search ...................... 250/363 S, 369, 362

[56] References Cited

U.S. PATENT DOCUMENTS 4,047,034  9/1977  Auphan ............................ 250/354.1
4,341,427  7/1982  Tomasetti et al. ..................... 445/6

Primary Examiner—Alfred E. Smith
Assistant Examiner—Richard Hanig
Attorney, Agent, or Firm—Mark H. Jay

[57] ABSTRACT

A method and device for stabilizing photomultiplier tubes of a radiation image device against drift by illuminating the photomultiplier tubes with light. A certain number of the photomultiplier tubes are arranged in an array for final application. Then the complete array is illuminated for a certain time period with light having an intensity to produce an average anode current in the photomultiplier tubes which is in the range of 1 to 50 μA.

20 Claims, 6 Drawing Figures

METHOD AND DEVICE FOR STABILIZING PHOTOMULTIPLIER TUBES OF A RADIATION IMAGE DEVICE AGAINST DRIFT

BACKGROUND OF THE INVENTION

1. Field of the Invention

This invention relates to a method and a device for stabilizing photomultiplier tubes of a radiation image device, in particular scintillation gamma camera against drift by illuminating the photomultiplier tubes with light.

2. Description of the Prior Art

It is known that the gain of photomultiplier tubes (PMT's) changes with time. Due to this, PMT's have to be retuned very often. Automatic retuning devices which utilize an additional light peak for retuning are for example described in the European Patent Application 0,066,763 and U.S. Pat. Nos. 3,900,731 and 4,047,034. In the case of the European Patent Application No. 0,066,763 the light peak is produced by an array of pulsed light emitting diodes, positioned close to the cathode ends of the PMT's. In the case of U.S. Pat. No. 3,900,731, the light peak is produced by a pulsed light emitting diode which is positioned in a light conductivity disc in front of the cathode end of a PMT and in the case of U.S. Pat. No. 4,047,034 a light peak produced by a pulsed light emitting diode is transferred to the cathode ends of the PMT's of an PMT array via a bundle of optical fibers. Another retuning method and device is described in the commonly owned, copending application Ser. No. 462,839 of Everett W. Stoub, entitled "A Method and Circuit for Stabilizing Conversion Gain of Radiation Detectors of a Radiation Detection System", which was filed on Feb. 2, 1983. For each radiation detector tuning point the energy map status is measured in parallel. Thereby an energy response vector is obtained, which is multiplied with a predetermined deconvolution matrix. The deconvolution matrix is the inversion of a contribution matrix containing matrix elements $C_{ij}$, each such matrix element $C_{ij}$ representing the relative contribution level of a radiation detector j of said detection system for a point radiation source placed at a location i. Thus a calculated gain vector is obtained with respect to which the gains of the radiation detectors are adjusted such that an ideal gain vector is obtained.

All these retuning methods and devices work only accurately when the magnitude of gain change lies within a certain range. At the very beginning of their life time PMT's drift most rapidly. Therefore, the dynamic tuning range of the aforementioned methods and devices can be exceeded within the first few months of operation. Due to this either manual adjustment or replacement of PMT's is required. This is very costly and time consuming.

It is known that PMT's can artifically be altered by illuminating with light. However, if at all, PMT's are "bright aged" by PMT manufacturers by arranging bundles of PMT's in a special room and illuminating them for a certain time period with a diffuse incandescent light source. As a result it should be expected that all illuminated PMT's have the same degree of "bright aging". However, as practice shows most of the "bright aged" PMT's after arranged in an array for final application will not have magnitudes of gain changes which lie in the range, in which the aforementioned retuning methods and devices work accurately.

SUMMARY OF THE INVENTION

It is an object of this invention to provide an improved method and device for stabilizing photomultiplier tubes of a radiation image device against drift.

According to this invention a method is provided for stabilizing photomultiplier tubes of a radiation image device against drift by illuminating the photomultiplier tubes with light comprising the steps of:

(a) arranging a certain number of said photomultiplier tubes in an array for final application; and (b) illuminating the complete array for a certain time period with light having an intensity to produce an average anode current in the photomultiplier tubes which is the range of 1 to 50 $\mu$A.

Also, according to this invention a device is provided for stabilizing photomultiplier tubes of a radiation image device against drift by illuminating the photomultiplier tubes with light, which photomultiplier tubes are arranged in an array and comprise cathode ends, comprising:

(a) a plurality of point light sources located proximate the cathode ends of the photomultiplier tubes;

(b) a power supply for the point light sources; and (c) means for adjusting the power supply to produce a light intensity at the point light sources such that when illuminating the array of photomultiplier tubes the photomultiplier tubes will be held at an average anode current in the range of 1 to 50 $\mu$A.

It has been shown by the inventors that all problems of retuning inherent in prior art PMT stabilization methods and devices making use of precedent "bright aging" or not can surprisely be avoided by simply "bright aging" the photomultiplier tubes after having them arranged in an array for final application. Manual adjustment or replacement of PMT's to bring all PMT's in a radiation detector head into a sufficient range for more easily retuning is no longer necessary. This is less costly and time consuming.

In a special embodiment of the invention the array of photomultiplier tubes is illuminated for one to four days, in particular three days, with light of such an intensity that the photomultiplier tubes are held during this time period at an anode current of 1 to 50 $\mu$A, in particular 10 $\mu$A. The light can be provided by a scintillation crystal of the radiation imaging device operated without a collimator normally required for radiation imaging, which crystal is impinged by the radiation of a radiation source (e.g. a $^{57}$Co sheet source with an activity of about 0.3 mCi or a $^{57}$Co point source with an activity of about 10 mCi) having somewhat less than the same activity as the radiation source used under normal imaging conditions. If a collimator is used the radiation must have considerably more activity than under normal conditions (e.g. a $^{57}$Co sheet source in the range of 30–300 mCi). The light can also be provided by an arrangement of light sources disposed proximate said photomulitplier tubes. The light sources in a special embodiment are light emitting diodes.

The foregoing and other objects, features and advantages of the invention will be apparent from the following detailed description of preferred embodiments of the invention, as illustrated in the accompanying drawings.

DETAILED DESCRIPTION OF THE PREFERRED EMBODIMENT

Figure 1:
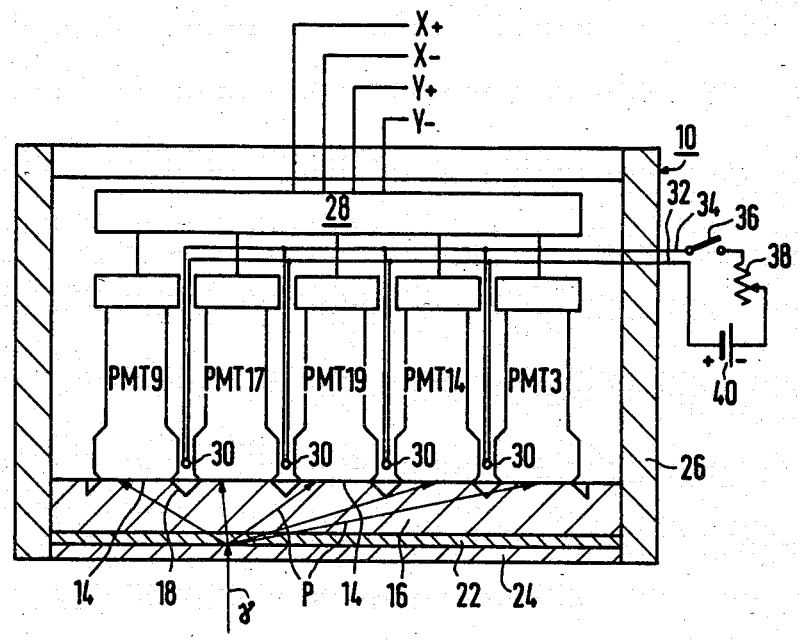
FIG. 1 is a diagrammatic side elevation and sectional view of a scintillation gamma camera utilizing the invention in a first embodiment with light emitting diodes as light sources.
Figure 2:
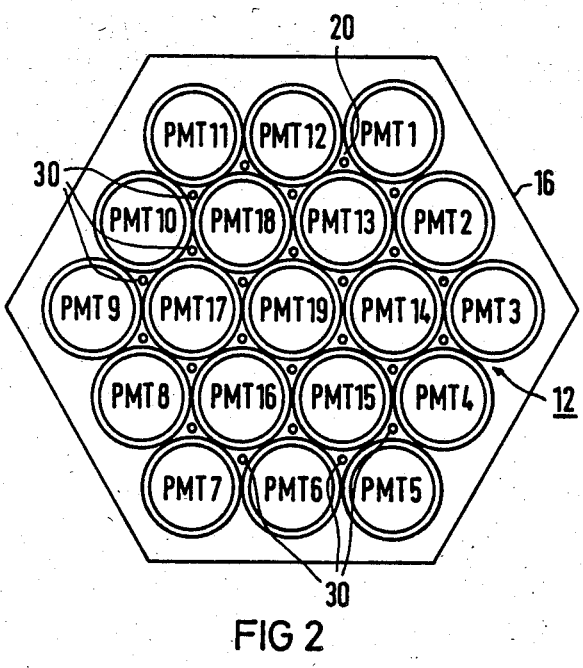
FIG. 2 is a plane view of the photomultiplier tubes of the face of the scintillation gamma camera according to FIG. 1.

The scintillation gamma camera head 10 shown in FIGS. 1 and 2 is of the Anger type. It comprises a certain number n (in this case for example n=19) of photomultiplier tubes PMT1 to PMTn. The photomultiplier tubes (PMT's) are arranged in an hexagonal array 12 on circular pads 14 of a light conductor 16 (e.g. of Plexiglass) having circular grooves 18 and interstices 20. A scintillation crystal 22 is arranged in front of the light conductor 16. The scintillation crystal 22 is closed by a cover 24 of e.g. aluminum and the sidewalls of a housing 26 for the camera head 10. The incidence of a gamma particle $\gamma$ on the material of the scintillation crystal 22 produces visible photons p which move via light conductor 16, at the input (cathode ends) of the photomultiplier tubes (PMT1 to PMTn). An electronic calculation network 28 applies deflection signals X+, X−, Y+, Y− in well known manner to a cathode ray tube or a digital display device (not shown).

The scintillation gamma camera head 10 has to be retuned from time to time. In this case this is preferably automatically done by a retuning method and device as described in the aforementioned commonly owned, copending patent application Ser. No. 462,839 filed Feb. 2, 1983 of Everett W. Stoub entitled "A Method and Circuit for Stabilizing Conversion Gain of Radiation Detectors of a Radiation Detection System". However, as previously mentioned this retuning method and device will work only accurately when the magnitude of gain change lies within a certain range. According to this invention this will be guaranteed by illuminating the array 12 of photomultiplier tubes PMT1 to PMT 19 for final application for one to four days (e.g. 3 days) with light of such an intensity that the photomultiplier tubes are held during this time period at an anode current of 1 to 50 $\mu A$. All PMT's being at for example 10 $\mu A \pm 2$ $\mu A$ would be a typical operating point.

In case of the embodiments of FIGS. 1 and 2 the light for illuminating the PMT's is produced by an arrangement of light emitting diodes 30 which are disposed proximate the cathode ends of the PMT's. All light emitting diodes 30 are connected via lines 32, 34, power switch 36 and variable resistor 38 (for light intensity adjustment) with a DC source 40 (e.g. battery). The arrangement of light emitting diodes 30 can (if desired) be removed from the array of PMT's after having finished the "bright aging".

Figure 3:
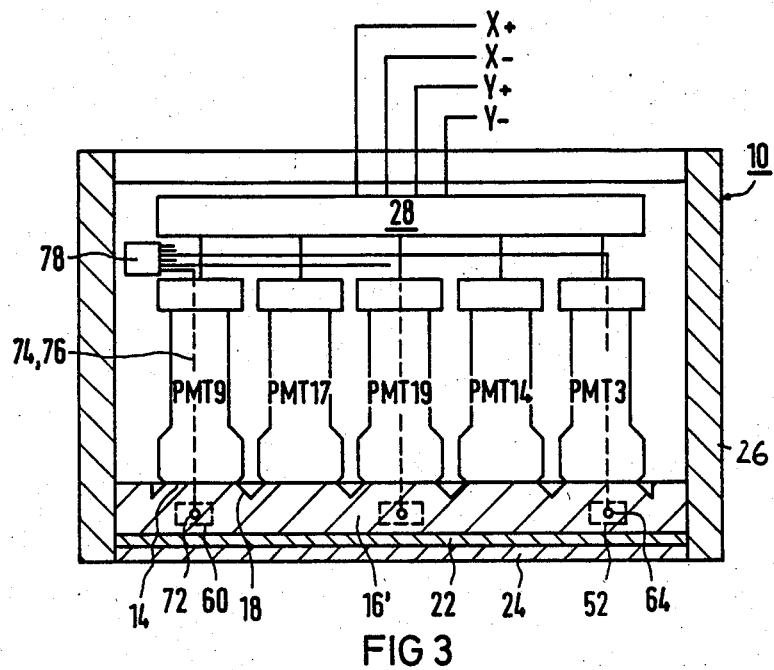
FIG. 3 is a diagrammatic side elevation and sectional view of a scintillation gamma camera utilizing the invention in a second embodiment with light emitting diodes as light sources.
Figure 4:
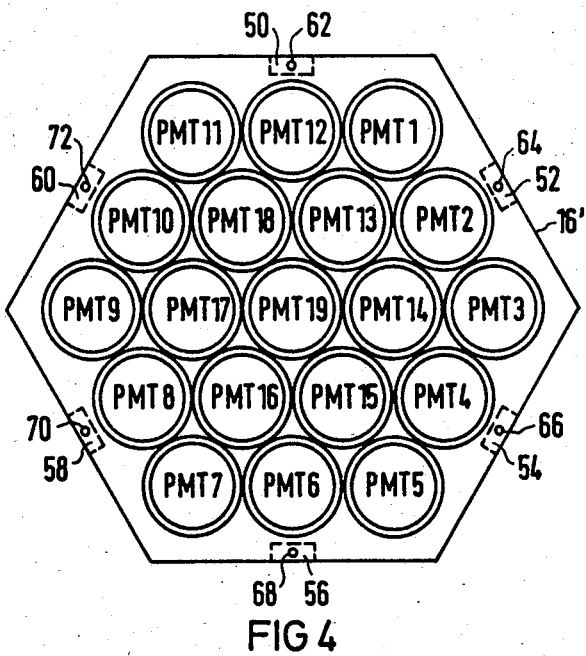
FIG. 4 is a plane view of the photomultiplier tubes of the scintillation gamma camera according to FIG. 3.

In FIGS. 3 and 4 the scintillation gamma camera head is practically the same as described for FIGS. 1 and 2 with one exception, namely that the light conductor 16′ comprises a certain number (e.g. six) of radial holes 50, 52, 54, 56, 58 and 60. In each of these holes is deposited a light emitting diode 62, 64, 66, 68, 70 and 72. Each of the diodes is connected via lines 74 and 76 with a box 78, which comprises again (not shown) a switch, a variable resistor and a DC source as illustrated in FIG. 1. The light of the diodes, 62, 64, 66, 68, 70 and 72 illuminates the cathode ends of the PMT's according to this invention. Since the light conductor 16′ works as an excellent light distributor merely a low number (namely for example 6) of diodes is necessary in the light source arrangement.

Figure 5:
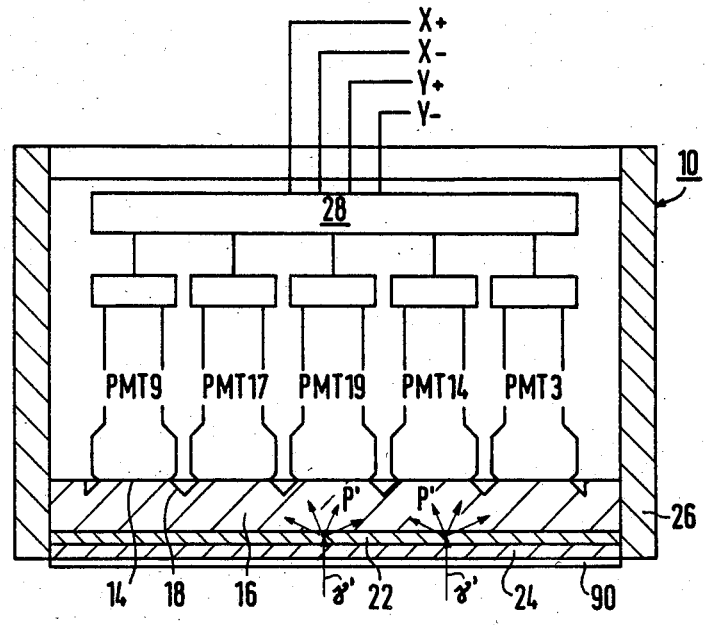
FIG. 5 is a diagrammatic side elevation and sectional view of a scintillation gamma camera utilizing the invention in a first embodiment with a scintillation crystal and a radiation source as light sources.
Figure 6:
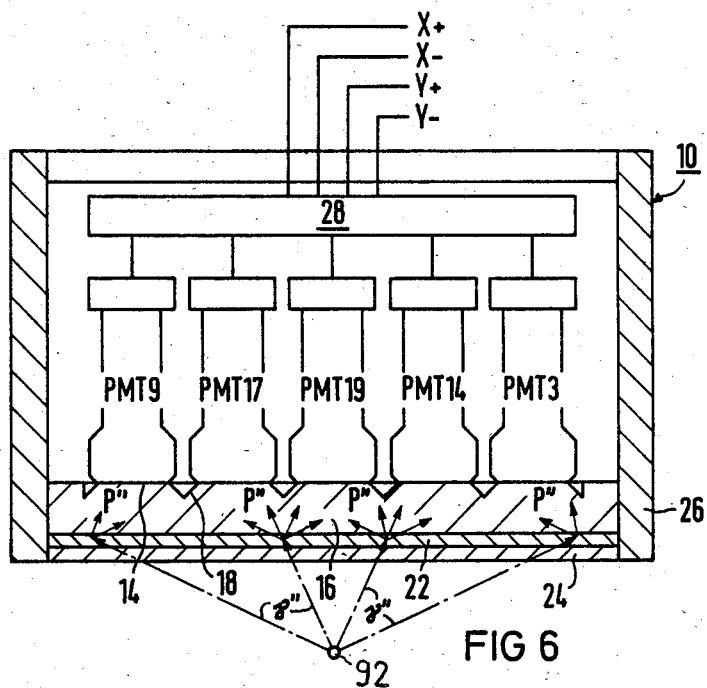
FIG. 6 is a diagrammatic side elevation and sectional view of a scintillation gamma camera utilizing the invention in a second embodiment with light emitting diodes as light sources.

FIGS. 5 and 6 show embodiments of the invention, wherein the light for illuminating the PMT's is provided by the scintillation crystal 22 of the scintillation gamma camera head 10 (p′ or p″) operated without a collimator normally required for radiation imaging, which crystal is impinged by the radiation ($\gamma'$ or $\gamma''$) of a radiation source having somewhat less than the same activity as the radiation source used under normal imging conditions. In the case of FIG. 5 the radiation source is a $^{57}Co$ sheet source 90 with an activity of about 0.3 mCi. In the case of FIG. 6, the radiation source is a $^{57}Co$ point source 92 with an activity of about 10 mCi, and so disposed as to illuminate the entire scintillation crystal.

Having thus described the invention with particular reference to the preferred forms thereof, it will be obvious to those skilled in the art to which the invention pertains, after understanding the invention, that various changes and modifications may be made therein without departure from the spirit and scope of the invention as defined by the claims appended hereto.

What is claimed is:

1. A method for stabilizing the gain of a plurality of photomultiplier tubes of a radiation image device against drift by illuminating the photomultiplier tubes with light, comprising the steps of:
   (a) arranging a predetermined number of said photomultiplier tubes in an array for operation in the radiation image device; and
   (b) illuminating the complete array with light having an intensity to produce an average anode current in each of the photomultiplier tubes which is in the range of 1 to 50 $\mu A$; and
   (c) timing the illumination for a predetermined interval of at least one day to obtain stabilization of the plurality of photomultiplier tubes.

2. A method according to claim 1, wherein said array of photomultiplier tubes is timed for one to four days with light of such an intensity that the photomultiplier tubes are held during this entire time interval at an anode current of 1 to 50 $\mu A$.

3. A method according to claim 2, wherein said light has an intensity sufficient to produce an average anode current in the photomultipliers of about 10 $\mu A$.

4. A method according to claim 2, wherein said array of photomultiplier tubes is timed for the predetermined interval of three days.

5. A method according to claim 1, wherein said light is provided by a scintillation crystal of said radiation imaging device operated without a collimator normally required for radiation imaging, which crystal is impinged by the radiation of a radiation source having somewhat less than the same activity as the radiation source used under normal imaging conditions.

6. A method according to claim 5, wherein said radiation source is a $^{57}$Co sheet source with an activity of about 0.3 mCi.

7. A method according to claim 5, wherein said radiation source is a $^{57}$Co point source with an activity of about 10 mCi, and so disposed as to illuminate the entire scintillation crystal.

8. A method according to claim 1, wherein said light is provided by an arrangement of light sources disposed proximate said photomultiplier tubes.

9. A method according to claim 8, wherein said light sources are light emitting diodes.

10. A method for stabilizing the gain of a plurality of photomultiplier tubes of assembled as an integral part of a radiation image device against drift by illuminating the photomultiplier tubes with light, comprising the steps of:
    (a) arranging a certain number of said photomultiplier tubes having cathode ends in an array for final application;
    (b) providing a plurality of point light sources proximate the cathode ends of the photomultiplier tubes;
    (c) adjusting the light intensity of the point light sources to produce an average anode current in the photomultiplier tubes which is in the range of 1 to 50 $\mu$A;
    (d) illuminating the cathode ends of the photomultiplier tubes in said array with the light of the so adjusted light point sources; and
    (e) timing the illumination for a predetermined period of time having a duration between one to four days.

11. A device for stabilizing the gain of photomultiplier tubes of a radiation image device against drift by illuminating the photomultiplier tubes with light, which photomultiplier tubes are arranged in an array, for providing a radiation image and comprise cathode ends, comprising:
    (a) a plurality of point light sources located proximate the cathode ends of the photomultiplier tubes;
    (b) a power supply for the point light sources; and
    (c) means for adjusting the power supply to produce a light intensity at the point light sources such that when illuminating the array of photomultiplier tubes the photomultiplier tubes will be held at an average anode current in the range of 1 to 50 $\mu$A for a predetermined interval.

12. A device according to claim 11, wherein a prescribed arrangement of point light sources is located in free spaces between the photomultiplier tubes in the array.

13. A device according to claim 11, wherein a predetermined arrangement of point light sources is located in a light conductor which is placed in the front of the array of photomultiplier tubes.

14. A device according to claim 11, wherein the plurality of point light sources is formed by a scintillation crystal in front of the array of the photomultiplier tubes and a radiation source in front of the scintillation crystal, which radiation source having somewhat less than the same activity as the radiation source under normal imaging conditions.

15. A device according to claim 12, wherein said light sources are light emitting diodes.

16. A device according to claim 13, wherein said light sources are light emitting diodes.

17. A device according to claim 14, wherein said radiation source is a $^{57}$Co sheet source with an activity of about 0.3 mCi.

18. A device according to claim 14, wherein said radiation source is a $^{57}$Co source with an activity of about 10 mCi.

19. A device according to claim 11, wherein the plurality of point light sources is formed by a scintillation crystal in front of the array of the photomultiplier tubes and a radiation source in front of the scintillation crystal when a collimator is used, which radiation source has considerably more activity than the radiation source used under normal imaging conditions.

20. A device according to claim 19, wherein said radiation source is a $^{57}$Co sheet source with an activity in the range of 30–300 mCi.

* * * * *